(12) United States Patent
Cohen et al.

(10) Patent No.: US 9,066,009 B2
(45) Date of Patent: Jun. 23, 2015

(54) METHOD FOR PROMPTING PHOTOGRAPHS OF EVENTS

(71) Applicant: Google Inc., Mountain View, CA (US)

(72) Inventors: Dave Cohen, Mountain View, CA (US); Timothy Sepkoski St. Clair, San Francisco, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/721,688

(22) Filed: Dec. 20, 2012

(65) Prior Publication Data

US 2014/0176748 A1    Jun. 26, 2014

(51) Int. Cl.
*H04N 5/225* (2006.01)
*H04N 5/232* (2006.01)

(52) U.S. Cl.
CPC ....... *H04N 5/23222* (2013.01); *H04N 5/23206* (2013.01)

(58) Field of Classification Search
USPC .................................................... 348/207.99
See application file for complete search history.

(56) References Cited

U.S. PATENT DOCUMENTS

| 7,805,066 | B2 | 9/2010 | Wexler et al. | |
|---|---|---|---|---|
| 7,870,035 | B1 | 1/2011 | Wolf et al. | |
| 8,228,413 | B2 | 7/2012 | Ellenby et al. | |
| 2006/0047586 | A1 | 3/2006 | Wolf | |
| 2008/0037826 | A1* | 2/2008 | Sundstrom et al. | 382/103 |
| 2008/0301241 | A1 | 12/2008 | Svendsen | |
| 2009/0141138 | A1 | 6/2009 | DeAngelis | |
| 2011/0184953 | A1 | 7/2011 | Joshi et al. | |
| 2012/0021829 | A1 | 1/2012 | Shoham et al. | |
| 2012/0109955 | A1 | 5/2012 | Lahcanski et al. | |
| 2012/0233000 | A1 | 9/2012 | Fisher et al. | |
| 2012/0265758 | A1 | 10/2012 | Han et al. | |
| 2012/0274828 | A1* | 11/2012 | Watanabe | 348/333.01 |
| 2012/0327252 | A1* | 12/2012 | Nichols et al. | 348/207.1 |
| 2012/0327265 | A1* | 12/2012 | Arujunan et al. | 348/231.3 |

OTHER PUBLICATIONS

International Search Report and Written Opinion mailed Dec. 9, 2014 in related application No. PCT/US13/76754.

* cited by examiner

*Primary Examiner* — Anthony J Daniels
(74) *Attorney, Agent, or Firm* — IP Spring (57) ABSTRACT

A computer-implemented method, computer program product, and computing system is provided for interacting with images having similar content. In an embodiment, a method may include identifying one or more event attributes associated with an ongoing event. The method may also include determining one or more statistical characteristics associated with the one or more of the event attributes. The method may further include generating a prompt to an event participant to take a photograph during the ongoing event based on, at least in part, the one or more statistical characteristics.

21 Claims, 5 Drawing Sheets

METHOD FOR PROMPTING PHOTOGRAPHS OF EVENTS

TECHNICAL FIELD

This disclosure relates to digital photographs and, more particularly, to sharing digital photographs of events.

BACKGROUND

The use of digital photography has become an important part of daily life for many individuals. Many cellular phones now include cameras and many social networking application facilitate the sharing of digital photos among many individuals and social groups. Not only has digital photography increased the ease with which photos may be shared by individuals, but the combination of digital cameras being incorporated into common every-day items, such as cellular phones, and the low relative cost of digital photography, due at least in part to the elimination of film and developing costs, have increased the number of pictures that people take. People may often take pictures of events. Photographs of events may often be shared with other individuals and social groups, for example through social networking applications or other collaborative sharing applications.

SUMMARY OF DISCLOSURE

According to an implementation, a computer-implemented method may include receiving a plurality of photographs associated with an ongoing event. The method may also include analyzing the plurality of photographs to determine one or more attributes of the plurality of photographs. The method may also include determining a statistical characteristic associated with the plurality of photographs based on, at least in part, the one or more attributes of the plurality of photographs. The method may further include generating, by the computing device, a prompt to an event participant to take photograph of one or more subjects based on statistical characteristics.

According to another implementation, a computer-implemented method may include identifying one or more event attributes associated with an ongoing event. The method may also include determining one or more statistical characteristics associated with the one or more of the event attributes. The method may further include generating a prompt to an event participant to take a photograph during the ongoing event based on, at least in part, the one or more statistical characteristics.

One or more of the following features may be included. Identifying the one or more event attributes may include receiving a plurality of photographs associated with the ongoing event. The one or more event attributes may include an identity of one or more event participants. The one or more event attributes may one or more event locations.

The one or more statistical characteristics may include a count of the number of photographs taken of each event participant. The one or more statistical characteristics may include a relative number of photographs taken of one event participant compared to another event participant. The one or more statistical characteristics may include a period of time since a photograph was last taken of a particular event participant.

The prompt to the event participant may include a prompt to take a photograph of a particular event participant. The prompt to the event participant may include a prompt to take a photograph of an event location. The prompt to the event participant may include a gamified prompt to take a photograph.

According to another implementation, a computing system may include at least one processor. The at least one processor may be configured to identify one or more event attributes associated with an ongoing event. The at least one processor may also be configured to determine one or more statistical characteristics associated with the one or more of the event attributes. The at least one processor may further be configured to generate a prompt to an event participant to take a photograph during the ongoing event based on, at least in part, the one or more statistical characteristics One or more of the following features may be included. The at least one processor configured to identify the one or more event attributes may be further configured to receive a plurality of photographs associated with the ongoing event. The one or more event attributes may include an identity of one or more event participants. The one or more event attributes may include one or more event locations.

The one or more statistical characteristics may include a count of the number of photographs taken of each event participant. The one or more statistical characteristics may include a relative number of photographs taken of one event participant compared to another event participant. The one or more statistical characteristics may include a period of time since a photograph was last taken of a particular event participant.

The prompt to the event participant may include a prompt to take a photograph of a particular event participant. The prompt to the event participant may include a prompt to take a photograph of an event location. The prompt to the event participant may include a gamified prompt to take a photograph.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

According to some example embodiments, various participants in an event, such as a party, meeting, gathering, or the like may take photographs of the event, including the other participants of the event, the surroundings or location of the event, and the like. Such photographs may memorialize or document the event. Often photographs taken at an event may be shared with other participants of the event, as well as friends or acquaintances who may not have attended the event. Because photographs taken during an event may provide a record of the event and/or may be shared with people who were not at the event, it may be desirable to obtain a rich array of photographs for the event to capture the greatest sense of the event. In some embodiments, systems and methods may be provided to encourage participants in the event to capture a well rounded and diverse collection of photographs of the event.

In some embodiments, an online space may be associated with the event. The online space, which may include, for example, an account or one or more pages on a social networking application, may include information regarding the event, such as who the invited participants of the event are, which participants actually attend the event, where the event is intended to take place, as well as various additional or alternative information. Further, the online space associated with the event may provide a repository for receiving photographs associated with the event (e.g., which may be uploaded to the online space by participants in the event), for receiving comments or posts by participants of the event, or by other users having access to the online space. The online space associated with the event may also provide a mechanism for sharing the photographs or other content (e.g., comments, posts, and the like) amongst participants of the event and/or with other individuals who may be authorized to access the online space.

In some embodiments, photographs uploaded to the online space associated with the event may be analyzed, for example, to determine the content of the photographs (e.g., individuals included in the photograph, locations of the photograph, and the like), who took the photograph, and the like. Based on, at least in part, the analysis of photographs uploaded to the online space associated with the event, prompts may be sent to one or more participants of the event to, for example, take more photographs in general (e.g., to provide more extensive photographic coverage of the event) and/or to take (more) photographs of particular subjects or sceneries (e.g., to provide more complete photographic coverage of the event, such as by ensuring that photographs have been taken of all of the event participants, etc.). Various additional/alternative features and aspects may also be included.

Figure 1:
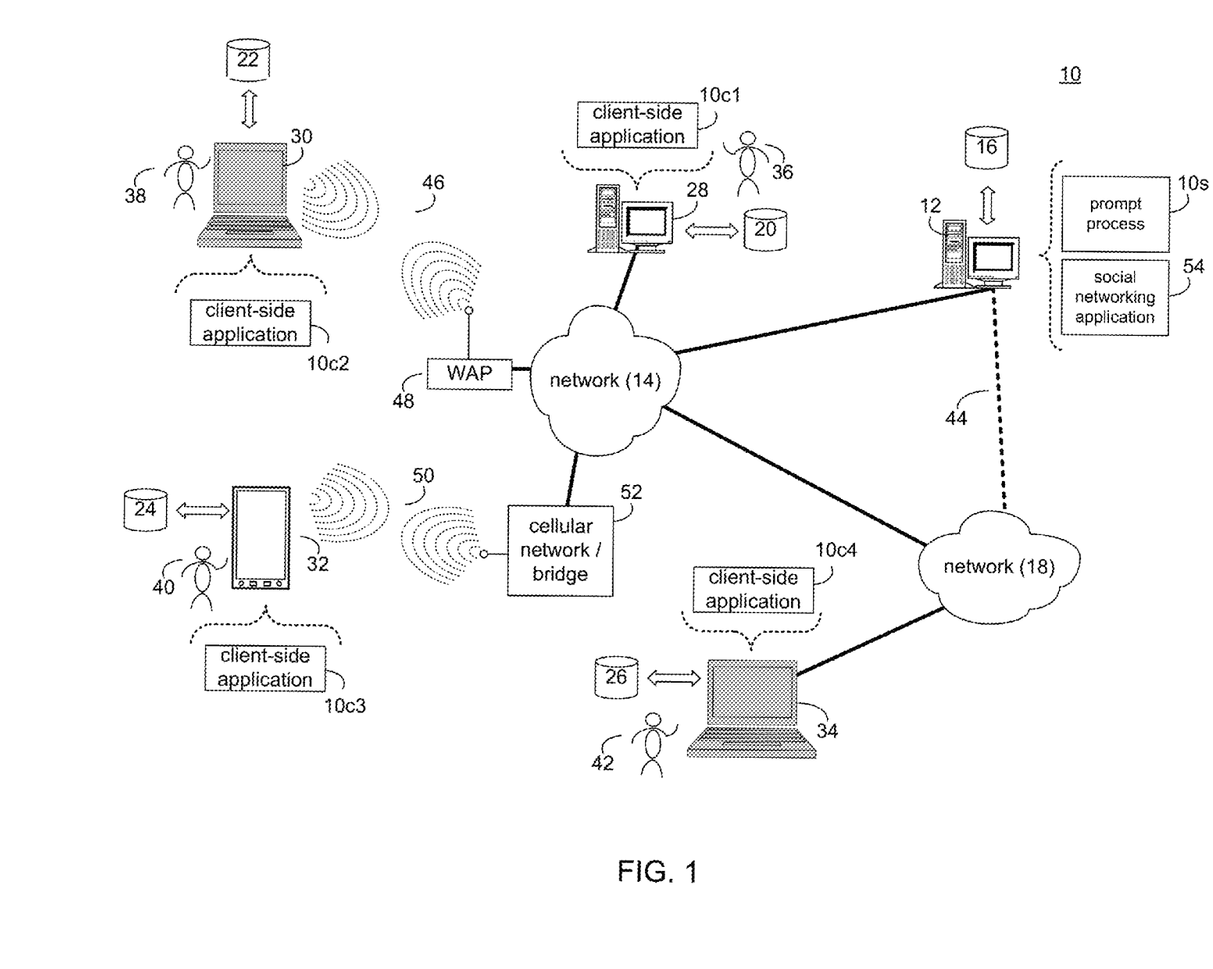
FIG. 1 is a diagrammatic view of a distributed computing network including a computing device that executes a photo prompt process according to an embodiment of the present disclosure.

Referring to FIG. 1, there is shown photo prompt process 10. For the following discussion, it is intended to be understood that photo prompt process 10 may be implemented in a variety of ways. For example, photo prompt process 10 may be implemented as a server-side process, a client-side process, or a server-side/client-side process.

For example, photo prompt process 10 may be implemented as a purely server-side process via photo prompt process 10s. Alternatively, photo prompt process 10 may be implemented as a purely client-side process via one or more of client-side application 10c1, client-side application 10c2, client-side application 10c3, and client-side application 10c4. Alternatively still, photo prompt process 10 may be implemented as a server-side/client-side process via photo prompt process 10s in combination with one or more of client-side application 10c1, client-side application 10c2, client-side application 10c3, and client-side application 10c4. In such an example, at least a portion of the functionality of photo prompt process 10 may be performed by photo prompt process 10s and at least a portion of the functionality of photo prompt process 10 may be performed by one or more of client-side application 10c1, 10c2, 10c3, and 10c3.

Accordingly, photo prompt process 10 as used in this disclosure may include any combination of photo prompt process 10s, client-side application 10c1, client-side application 10c2, client-side application 10c3, and client-side application 10c4.

Figure 2:
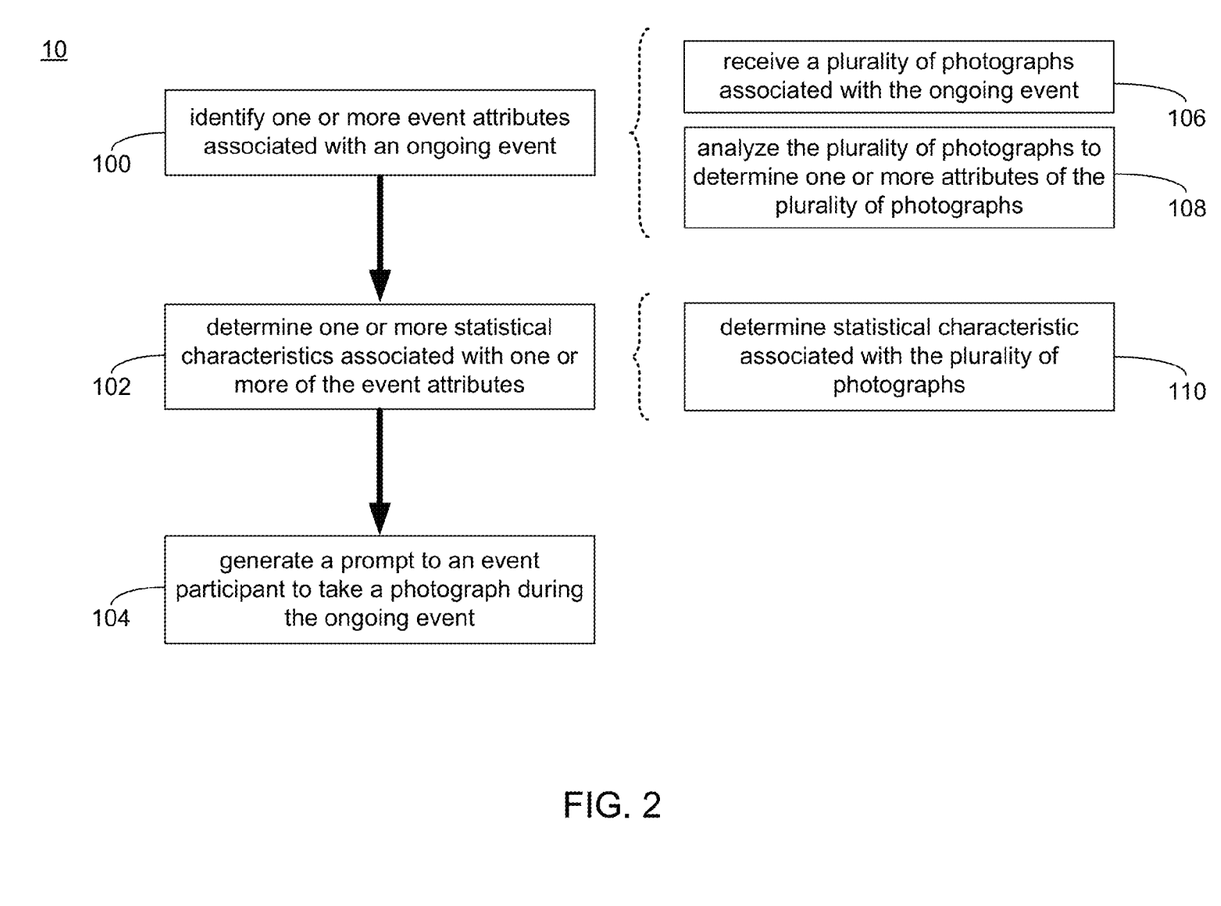
FIG. 2 is a flowchart of the photo prompt process of FIG. 1, according to an embodiment of the present disclosure.

Referring also to FIG. 2 and as will be discussed below in greater detail, photo prompt process 10 may identify 100 one or more event attributes associated with an ongoing event. Photo prompt process 10 may also determine 102 one or more statistical characteristics associated with the one or more of the event attributes. Photo prompt process 10 may further generate 106 a prompt to an event participant to take a photograph during the ongoing event based on, at least in part, the one or more statistical characteristics.

Photo prompt process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of photo prompt process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a smartphone operating system or application, a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32 (e.g., a smartphone, a tablet computing device, a netbook, a mobile gaming console, a network enabled digital camera, etc.), notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

In one or more implementations in which photo prompt process 10 may include a server-side process and/or a hybrid server-side/client-side process, users 36, 38, 40, 42 may access photo prompt process 10 directly through network 14 or through secondary network 18. Further, photo prompt process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channel 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, photo prompt process 10 may communicate with, interact with, and/or include a component or module of a social networking application (e.g., social networking application 54). As may generally be understood, a social networking application (e.g., social networking application 54) may generally allow users of social networking application 54 to interact with one another via computing networks (e.g., including the forming of social connections between users and/or groups of users; sharing information, interests, media and/or other content, etc.). In some instances, interactions between user of social networking application 54 may be facilitated by user accounts associated with each respective user of social networking application 54. The user accounts may, for example, include profile information about the respective user associated with the user account. The information associated with each respective user may be maintained on and/or be accessible as one or more webpages. Social networking application 54 may also provide online collaborative spaces that may be associated with events (e.g., which may also be referred to as "event pages"). In various embodiments an event page may include event information and/or attributes, such as, but not limited to, a list of event invitees, indications of event participants (e.g., event invitee that actually participate in the event), event time, event location, topical information regarding the event, and the like. In some instances, event pages may facilitate scheduling and/or arranging events, including, for example, inviting individuals to the event, scheduling the event, defining event attributes, etc. Event pages may also allow information regarding the event to be published or shared among participants of the event and/or with other users. Information regarding the event may include, for example, discussions about the vent among authorized users (e.g., who may include event invitees and/or other users), media associated with the event (e.g., photographs, videos, audio clips, etc.), which may be posted or uploaded by event participants, and/or other users.

As generally discussed above, photo prompt process 10 may generally facilitate providing rich and/or more extensive photographic coverage of an event. In some embodiments, photo prompt process 10 may provide prompts to participants of an event to encourage the participants to take photographs that may provide better photographic coverage of the event (e.g., more photographs of event participants and/or event settings, such as event venue or location). In some embodiments, the prompts to participants of the event may be based on statistical analysis of photographs that have already been taken at the event, e.g., to determine if one or more event participants or event settings are under represented and/or over represented in the photographs of the event that have been taken.

According to an embodiment, photo prompt process 10 may identify 100 one or more event attributes associated with an ongoing event. Photo prompt process 10 may also determine 102 one or more statistical characteristics associated with the one or more of the event attributes. Photo prompt process 10 may further generate 104 a prompt to an event participant to take a photograph during the ongoing event based on, at least in part, the one or more statistical characteristics.

For example, photo prompt process 10 may identify 100 one or more event attributes associated with an ongoing event. The ongoing event may include, for example, an event that may have already begun, but may not have yet ended. For example, the start time and end times of the event may be specified by invitations that may have been sent to one or more event participants (e.g., via social networking application 54 and/or via another scheduling application). Further, in some embodiments, the start time and end time for an event may be based upon, for example, information concerning the event that may be included on an event page that may be, for example, provided via social networking application 54. As such, the one or more identified 100 event attributes may include attributes that relate to the event during a time period while the event is ongoing.

The one or more event attributes may include, for example, an identity of one or more event participants. For example, the event page may include a list or other indicator of event invitees (i.e., individuals who have been invited to participate in the event). The identity of the one or more event participants may be assumed to include all of the event invitees. Further, in some embodiments, the identity of the one or more event participants may include identities of event invitees who actually attend or otherwise participate in the event (e.g., which may, in some embodiments, be distinguished from individuals who may have been invited to the event, but who do not attend or participate in the event). The identity of event participants (e.g., which may include individuals who actually attend and/or participate in the event) may be based on for example, checkins by event participants. A checkin by an event participant may be an indication by an event invitee that he has arrived at the location of the event, or is otherwise participating in the event. A checkin by an event participant may be indicated by publishing a checkin signal to the event page provided by social networking application 54. In some embodiments, the identity of event participants in the ongoing event may be based on, at least in part, location services that may be provided by a mobile computing device associated with an event participant (e.g., smartphone 32 associated with user 40). For example, photo prompt process 10, social networking application 54, and or another application may poll (and/or receive from) one or more mobile computing devices associated event invitees location information associated with the mobile computing devices. The location information may be based on, for example, GPS information provided by the mobile computing device, cell tower triangulation, and/or other location services available in connection with the mobile computing devices. In situation in which a location associated with a mobile computing device associated with an event invitee corresponds to an event location (e.g., as may be indicated by event information included on the event page) during the scheduled time of the event, the event invitee may be considered to be an event participant (e.g., may be considered to be present and/or participating in the event).

The one or more event attributes may additionally/alternatively include one or more event locations. As generally discussed above, a location for the event may be included in the event information on the event page provided by social networking application 54, for example. Photo prompt process 10 may identify the event location based on the event page as being an event attribute. In some embodiments, in addition/as an alternative to the event location based on the event page, photo prompt process 10 may identify 100 one or more event locations based on locations associated with one or more event participants during the course of the ongoing event. For example, if an event invitee has checked into the event (e.g., thereby becoming an event participant), the location of the event may be based on the location of the event participant (e.g., which may be determined based on, at least in part, location services provided by a mobile computing device associated with the event participant, as generally discussed above). Further, in some embodiments, a location associated with a plurality of event invitees during the time of the event may be determined. In a situation in which a plurality of the event invitees are determined to be proximate with one another (e.g., within a defined distance of one another, as may be established by system settings and/or user preferences), photo prompt process 10 may identify an event location attribute as being the location of the plurality of event invitees who are proximate to one another. Further, in such a situation in which a plurality of event invitees are proximate to one another while the event is ongoing, the plurality of event invitees may be determined to be present at and/or participating in the event (e.g., may be determined to be event participants).

As generally discussed, the one or more event attributes may be based on, at least in part, information that may be associated with the event page provided by social networking application 54. Additionally/alternatively, in some embodiments photo prompt process 10 may identify 100 the one or more event attributes based on, at least in part, receiving 106 a plurality of photographs associated with the ongoing event. For example, one or more event participants may take photographs during the ongoing event and may publish the photographs, such as to an online space associated with the event (e.g., the event page) or to another online space (e.g., a personal page associated with the event participant on social networking application 54). In some embodiments, the photographs may be published as soon as the photographs are taken (e.g., based on one or more features or setting associated with the device used to take the photographs and/or periodic polling of the device used to take the photographs by the online space to determine if any new photographs have been taken). Photographs published to the event page may be determined to be associated with the event by virtue of having been published to the event page. Photographs published to other online spaces may be associated with the event, for example, based on, at least in part, one or more of tags associated photographs (e.g., indicating that the photograph is of the event), location information associated with the photographs (e.g., indicating that the photograph was taken at a location associated with the event during the time of the event), subjects of the photographs (e.g., event participants being included in the photographs, as may be determined based on tags, facial recognition, etc.), the photograph having been published by an event participant, and or based on other features or attributes of the photograph, the online space, the publisher of the photograph, or the like.

Photo prompt process 10 may identify 100 one or more attributes associated with an ongoing event including analyzing 108 the plurality of photographs to determine one or more attributes of the plurality of photographs. For example, photo prompt process 10 may analyze 108 the received 106 photographs to determine the identity 100 of subjects of the photographs (e.g., based on, at least in part, tags, facial recognition, or the like), to identify 100 locations of the photographs (e.g., based on, at least in part, tags, explicit location data, scenery recognition, or the like), as well identifying 100 as times associated with the photographs (e.g., based on, at least in part, tags, timestamp meta data, time at which the photograph was published, or the like), and the like.

Photo prompt process 10 may also determine 102 one or more statistical characteristics associated with the one or more of the event attributes. For example in an embodiment determining 102 one or more statistical characteristics associated with the one or more event attributes may include determining 110 a statistical characteristic associated with the plurality of received 106 photographs based on, at least in part, the one or more attributes of the plurality of photographs determined via analyzing 108 the plurality of photographs. In such an embodiment, the statistical characteristics may be utilized to determine a degree and scope of photographic coverage of the event.

The one or more statistical characteristics may include a count of the number of photographs that have been taken of each event participant. As generally discussed above, in some embodiments photo prompt process 10 may identify 100 an identity of event participants. Further, based on the received 106 photographs photo prompt process 10 may determine 102 a number of photographs that have been takes of each event participant. As generally described above, photo prompt process 10 and/or another process or application may analyze 108 the plurality of photographs, e.g., to determine individuals included in the photograph, locations of the photograph, a time of the photograph, etc. As such, photo prompt process 10 may determine 102 which event participants have had their picture taken during the ongoing event and which event participants have not had their picture taken during the ongoing event. Further, based on, at least in part, the number of photographs that have been taken of each event participant, photo prompt process 10 may determine 102 a statistical characteristic that may include a relative number of photographs that have been taken of one event participant compared to at least another event participants. As such, the determined 102 statistical characteristics may indicate that one or more event participants are not being as frequently photographed as others, or are being more frequently photographed than others. Based on such a statistical characteristic, photo prompt process 10 may determine if an even distribution of photographic coverage of the event is being obtained.

The one or more statistical characteristics may include a period of time since a photograph was last taken of a particular event participant. For example, in a generally related manner to the above discussed determination 102 that a particular individual may be under-represented or over-represented in the overall photographic coverage of the ongoing event, photo prompt process 10 may determine 102 that there has been a relatively long time since a photograph has been taken of a particular event participant (e.g., in absolute terms and/or as compared to time periods associated with other event participants). For example, the statistical characteristic may indicate that one or more photographs were take of a particular event participant a the beginning of the event, but that it has been a while (e.g., forty minutes) since a photograph was taken of that particular participants. As such, even if the particular event participant may be comparably photographically covered in terms of total number of photographs that the particular participant appears in, the particular participant may be under-represented in the photographic coverage of the ongoing event from a time-wise perspective. Further, photo prompt process 10 may determine 102 a statistical characteristic based on, for example, the number of group photographs as compared to the number photographs of individual event participants. Such a statistical characteristic may indicate, for example, that group photographs are under/over represented in the photographic coverage of the event as compared to individual photographs.

Similarly, a statistical characteristics associated with the identity of one or more event participants as event attributes may indicate that two or more event participants have participated in a group photograph each year for the last three years. Further, photo prompt process 10 may determine that it has been approximately one year since the event participants have last participated in a group photograph. As such, photo prompt process 10 may determine that a time associated with the ongoing event may generally correspond to a time period between the previous group photographs.

In an embodiment, photo prompt process 10 may identify that a location associated with the event may have changed. For example, an event may have initially included a group of friends (e.g., event participants) attending a jazz concert together at a local jazz club (e.g., an event location). After the jazz concert, at least a portion of the event participants may decide to go to dinner at a favorite restaurant. Based on a plurality of the event participants being in proximity to one another at the restaurant, photo prompt process 10 may identify 100 a change in the location event attribute associated with the ongoing event (e.g., resulting from the friends travelling from the venue of the jazz concert to the restaurant). Further, photo prompt process 10 may determine 102 a statistical characteristic associated with a number of photographs that were taken at the jazz concert and a number of photographs taken at the restaurant. For example, photo prompt process 10 may determine 102 that fifty photographs were taken at the jazz concert, but only five photographs have been taken at the restaurant, which may indicate an under-representation of photographic coverage associated with the restaurant location of the ongoing event.

Photo prompt process 10 may further generate 104 a prompt to an event participant to take a photograph during the ongoing event based on, at least in part, the one or more statistical characteristics. For example, the one or more statistical characteristics may indicate photographic coverage with respect to one or more event attributes (such as, one or more event participants, event locations, or the like) may be outside of a desired threshold (e.g., which threshold may generally be associated with a desired level or degree of extent, diversity, and/or balance of photographic coverage). For example, an extent of photographic coverage may generally relate to a total number of photographs taken during the ongoing event that pertain to a particular event attribute (e.g., one or more particular event participants and/or event participants as a whole, one or more event locations, etc.). A diversity of photographic coverage may generally relate to the degree to which photographs making up the photographic coverage of the event differ in terms of subject (participants and location, group photographs, individual photographs), composition, time at which the photograph was taken, etc. A balance of photographic coverage may generally relate to a relative number of photographs of one event participant as compared to a number of photographs of another event participant, a number of photographs of individual event participants as compared to a number of photographs of groups of event participants, a number of photographs of event participants compared to a number of photographs of event locations (e.g., scenery, etc.), and the like. It will be appreciated that the foregoing discussion of extent, diversity, and balance of photographic coverage are intended for the purpose of illustration only, and should not be construed as a limitation of the present disclosure.

According to some embodiments, photo prompt process 10 may prompt 104 an event participant to take a photograph during the ongoing event to achieve a desired and/or increased extent, diversity and/or balance of photographic coverage. Statistical characteristic thresholds for generating 104 prompts may be established (e.g., based on system settings and/or user preferences) for different statistical characteristics. For example, a threshold may be established for, but is not limited to, a desired variance in the number of photographs taken of any one event participant relative to any other event participant, a desired general ratio of the number of photographs of individual event participants to the number of photographs of groups of event participants, a desired general ratio of the number of photographs taken of event participants to the number of photographs taken of event locations, and the like.

As generally discussed, photo prompt process 10 may generate 104 a prompt to take a photograph during the ongoing event, e.g., which may achieve a rich photographic coverage of the ongoing event. For example, a statistical characteristic associated with an event attribute may indicate that one or more event participants has not been photographed during the event, or has been photographed relatively infrequently compared to other event participants, which may result in that event participant being underrepresented in photographs of the ongoing event. As such, photo prompt process 10 may generate 104 a prompt for one or more other event participants to take a photograph of the underrepresented event participant, to thereby improve that event participants representation in photographs of the ongoing event. In a generally similar manner, photo prompt process 10 may generate 104 a prompt for an event participant to take a photograph of an event location, for example if the location has changed, or if statistically few photographs have been taken of the event location or scenery.

Figure 3:
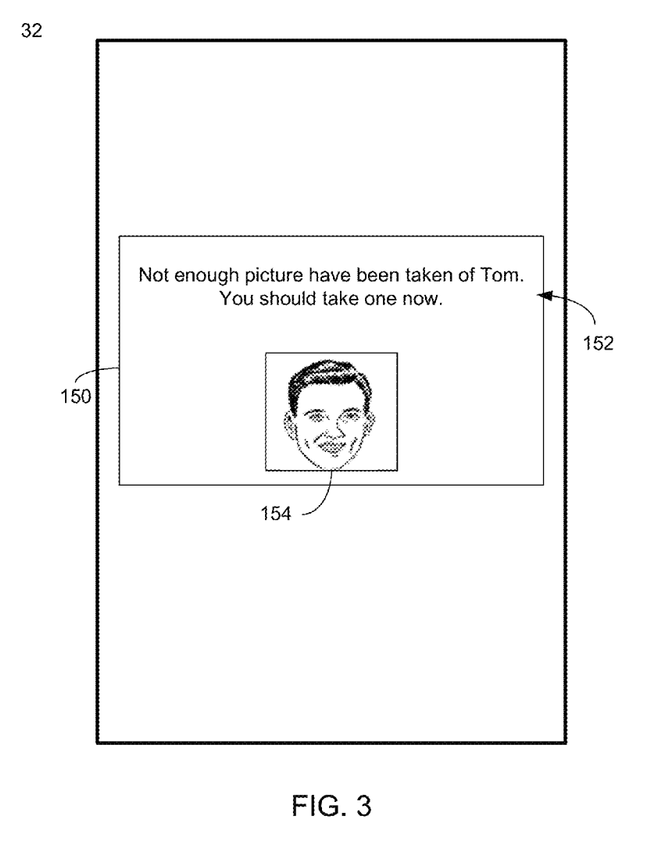
FIG. 3 is diagrammatic representation of a prompt that may be generated in connection with the photo prompt process of FIG. 1, according to an embodiment of the present disclosure.

For example, and referring also to FIG. 3, photo prompt process 10 may determine 102 that a particular event participant (e.g., "Tom") has been underrepresented in the photographic coverage of the event. As such, photo prompt process 10 may generate 104 prompt 152, e.g., which may be sent to mobile computing device 32 associated with user 40, who may be identified 100 as an event participant. Further, mobile computing device 32, may be determined to include camera functionality, (e.g. based on device characteristics that may be ascertained by photo prompt process 10, based on previously uploaded photographs during the ongoing event, etc.), that may allow user 40 to take a photograph. As shown, in an embodiment prompt 150 (e.g., which may be transmitted to mobile computing device 32 associated with use 40) may include request 152 that user 40 take a picture of Tom. Further, in an embodiment, prompt 150 may additionally include a picture of Tom (e.g., based on, at least in part, one or more of a previously uploaded photograph of Tom during the ongoing event, a profile picture of Tom on a social networking application, or other photograph identifiable as Tom). As such, even in the event that user 40 may not know who Tom is, it may still be possible for user 40 to take a photograph of Tom in response to the prompt.

In an embodiment photo prompt process 10 may generate 104 a prompt directed to an event participant (e.g., user 40) based on, at least in part, random selection, previously uploaded photographs of the ongoing event by user 40 (e.g., which may be indicative of user 40 having a camera), or the like. Further, in an embodiment, photo prompt process 10 may determine that user 40 may be in relatively close proximity to Tom (e.g., based on location services provided by mobile computing device 32 and a mobile device providing location services associated with Tom, and/or in another suitable manner). As such, photo prompt process 10 may determine that user 40 may be well positioned to take a photograph of Tom.

Figure 4:
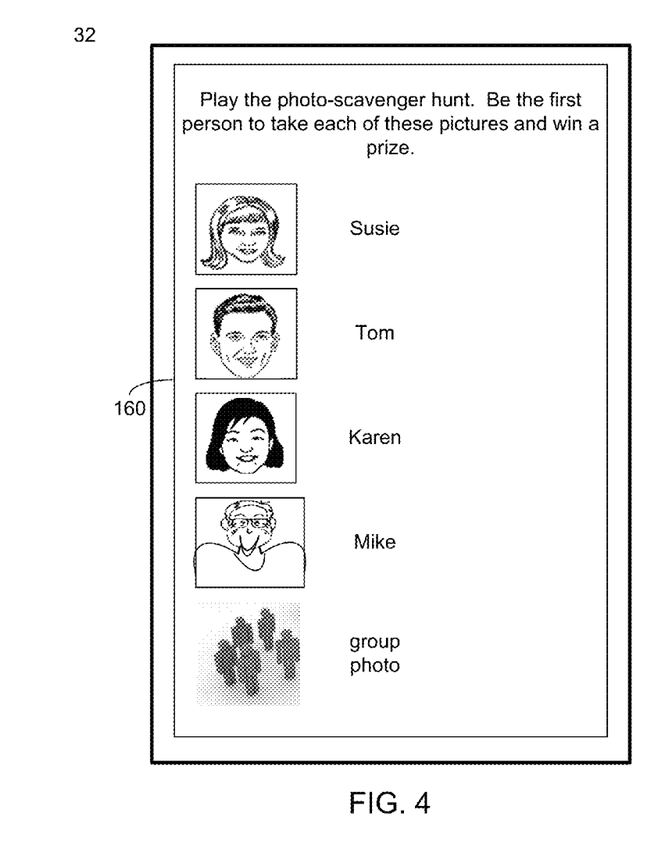
FIG. 4 is a diagrammatic representation of a user interface that may be generated, at least in part, by the photo prompt process of FIG. 1, according to an embodiment, of the present disclosure.

In some situations, the prompt to an event participant to take a photograph may include a gamified prompt. A gamified prompt may, for example, leverage social interaction or competitiveness to facilitate improving photographic coverage of the ongoing event. For example, a gamified prompt may establish a competition between two or more event participants to be the first to take a photograph of a particular event participant, to be the first person to take a photograph of all other event participants, or the like. For example, and referring also to FIG. 4, photo prompt process 10 may generate 104 gamified prompt 160. As shown, gamified prompt 160 may invite user 40 (e.g., with whom mobile computing device 32 may be associated) to participate in a photographic scavenger hunt, to be the first person to take each of the identified photographs. Further, gamified prompt may further seek to motivate user 40 to participate by indicating that prizes may be awarded to the winner of the photographic scavenger hunt. As generally discussed, prompts may also be gamified in other manners as well.

Figure 5:
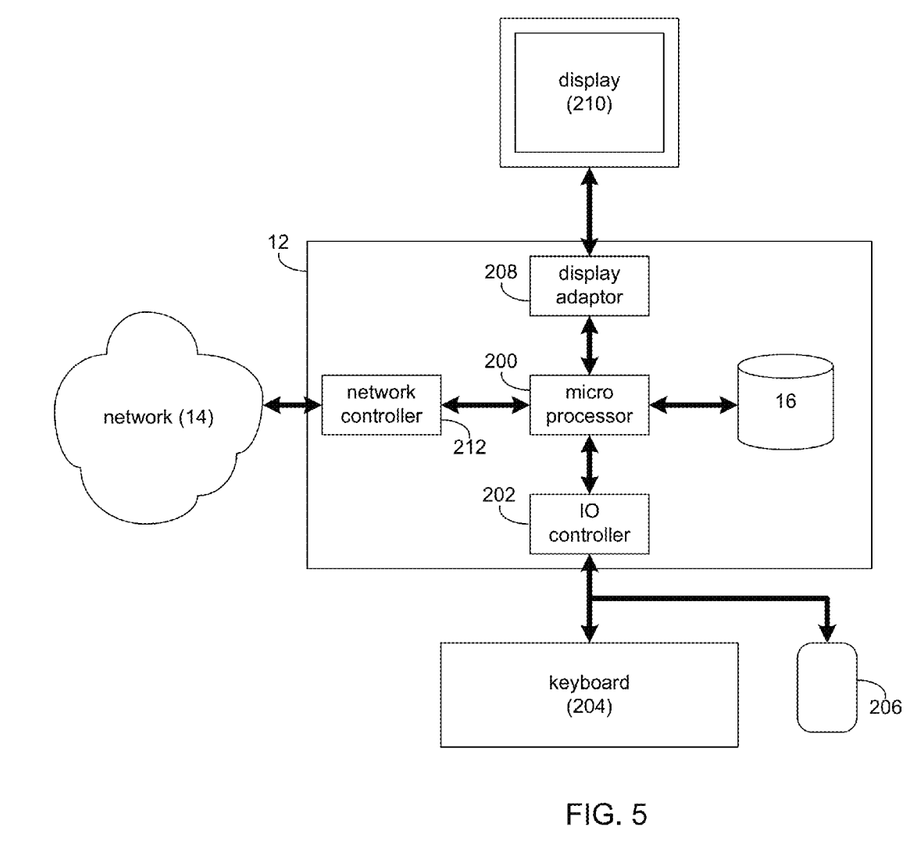
FIG. 5 is a diagrammatic view of the computing device of FIG. 1, according to an embodiment of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, photo prompt process 10 may be substituted for computing device 12 within FIG. 5, examples of which may include but are not limited to client electronic devices 28, 30, 32, 34.

Computing system 12 may include microprocessor 200 configured to e.g., process data and execute instructions/code for photo prompt process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, by a computing device, a plurality of photographs associated with an ongoing event;
analyzing, by the computing device, the plurality of photographs to determine two or more attributes of the plurality of photographs, wherein the two or more attributes include an identity of at least one event participant and time associated with the photographs;
determining, by the computing device, a statistical characteristic associated with the plurality of photographs including a period of time since the last photograph was last taken of at least one of the identified event participants based on, at least in part, the identity of the at least one event participant and the time associated with the photographs; and
generating, by the computing device, a prompt to an event participant to photograph one or more of the event participants based on the statistical characteristic.

2. A computer-implemented method comprising:
identifying, by a computing device, one or more attributes related to an ongoing event, wherein the attributes include receiving a plurality of photographs taken at the event, each photograph having a time associated with the photograph;
determining, by the computing device, one or more statistical characteristics associated with the one or more attributes, based at least in part, on a period of time since the last photograph was last taken of at least one subject; and
generating, by the computing device, a prompt to take a photograph during the event based on, at least in part, the one or more statistical characteristics.

3. The computer-implemented method of claim 2, wherein the subject includes at least one event participant and the one or more attributes include an identity of the at least one event participant.

4. The computer-implemented method of claim 2, wherein the one or more attributes include one or more event locations.

5. The computer-implemented method of claim 2, wherein the one or more statistical characteristics include a count of a number of photographs taken of the at least one subject.

6. The computer-implemented method of claim 2, wherein the one or more statistical characteristics include a relative number of photographs taken over a period of time of the at least one subject compared to another subject.

7. The computer-implemented method of claim 2, wherein the one or more statistical characteristics include a period of time since a photograph was last taken of a particular event participant.

8. The computer-implemented method of claim 2, wherein the prompt includes a prompt to take a photograph of a particular event participant.

9. The computer-implemented method of claim 2, wherein the prompt includes a prompt to take a photograph of an event location.

10. The computer-implemented method of claim 2, wherein the prompt includes a gamified prompt to take a photograph.

11. The computer-implemented method of claim 2, wherein the period of time since the last photograph was last taken of the at least one subject is outside of a threshold time for taking the photographs.

12. A computing system comprising at least one processor, the at least one processor configured to:
identify one or more attributes related to an ongoing event, wherein the attributes include receiving a plurality of photographs taken at the event, each photograph having a time associated with the photograph;

determine one or more statistical characteristics associated with the one or more of the attributes, based at least in part, on a period of time since the last photograph was last taken of at least one subject; and generate a prompt to take a photograph during the event based on, at least in part, the one or more statistical characteristics.

13. The computing system of claim 12, wherein the subject includes at least one event participant and the one or more attributes include an identity of the at least one event participant.

14. The computing system of claim 12, wherein the one or more attributes include one or more event locations.

15. The computing system of claim 12, wherein the one or more statistical characteristics include a count of a number of photographs taken of the at least one subject.

16. The computing system of claim 12, wherein the one or more statistical characteristics include a relative number of photographs taken over a period of time of one subject compared to another subject.

17. The computing system of claim 12, wherein the one or more statistical characteristics include a period of time since a photograph was last taken of a particular event participant.

18. The computing system of claim 12, wherein the prompt includes a prompt to take a photograph of a particular event participant.

19. The computing system of claim 12, wherein the prompt includes a prompt to take a photograph of an event location.

20. The computing system of claim 12, wherein the prompt includes a gamified prompt to take a photograph.

21. The computing system of claim 12, wherein the period of time since the last photograph was last taken of the at least one subject is outside of a threshold time for taking the photographs.

* * * * *